United States Patent [19]
Mazziotti

[11] Patent Number: 5,368,523
[45] Date of Patent: * Nov. 29, 1994

[54] FIXED CV UNIVERSAL JOINT WITH SERVICEABLE INSERTS

[75] Inventor: Philip J. Mazziotti, Toledo, Ohio

[73] Assignee: The Zeller Corporation, Defiance, Ohio

[*] Notice: The portion of the term of this patent subsequent to Jun. 29, 2010 has been disclaimed.

[21] Appl. No.: 988,683

[22] Filed: Dec. 10, 1992

Related U.S. Application Data

[63] Continuation-in-part of Ser. No. 772,339, Oct. 7, 1991, Pat. No. 5,222,914, which is a continuation of Ser. No. 573,397, Aug. 27, 1990, abandoned, which is a continuation-in-part of Ser. No. 321,861, Mar. 10, 1989, abandoned.

[51] Int. Cl.$^5$ .................................... F16D 3/223
[52] U.S. Cl. ............................ 464/144; 464/145; 464/906
[58] Field of Search ............... 464/143, 144, 145, 146, 464/906

[56] References Cited

U.S. PATENT DOCUMENTS

| | | | |
|---|---|---|---|
| 1,208,252 | 12/1916 | Westinghouse | 464/143 |
| 1,843,211 | 2/1932 | Davis | 464/143 X |
| 2,128,088 | 8/1938 | Hanft | 464/143 |
| 2,427,237 | 9/1947 | Suczek | 464/906 X |
| 3,071,944 | 1/1963 | Mazziotti et al. | 464/906 X |
| 3,083,548 | 4/1963 | Zeidler | 464/144 |
| 3,133,431 | 5/1964 | Zech | 464/144 |
| 4,541,819 | 9/1985 | Mazziotti | 464/144 |
| 5,222,914 | 6/1993 | Mazziotti | 464/906 X |

FOREIGN PATENT DOCUMENTS

| | | | |
|---|---|---|---|
| 45608 | 1/1970 | Japan | 464/145 |
| 3521 | of 1907 | United Kingdom | 464/143 |
| 760681 | 11/1956 | United Kingdom | 464/145 |
| 0962454 | 7/1964 | United Kingdom | 464/145 |
| 2076936 | 12/1981 | United Kingdom | 464/144 |
| 774637 | 10/1980 | U.S.S.R. | 464/146 |

Primary Examiner—Daniel P. Stodola
Assistant Examiner—Eileen A. Dunn
Attorney, Agent, or Firm—Allen D. Gutchess, Jr.

[57] ABSTRACT

A fixed constant velocity universal joint having direct spherical contact and support between inner and outer race members to prevent axial movement has inserts which can be replaced, when worn, with new inserts. The universal joint includes an inner race member having a plurality of recesses and an outer race member with a plurality of recesses, each containing one of the inserts. Bearing balls are located in grooves in the inserts which are so arranged that they require axial support in one direction only by a retainer which is fully enclosed in the universal joint and abuts the bearing balls. A seal engages the inner and outer race members on the side of the bearing balls opposite the retainer. The seal includes a base held in an annular recess in the outer race member and at least one resilient finger engaging a partially spherical surface on the inner race member.

18 Claims, 2 Drawing Sheets

FIXED CV UNIVERSAL JOINT WITH SERVICEABLE INSERTS

This application is a continuation-in-part of my application Ser. No. 772,339, filed on Oct. 7, 1991, now U.S. Pat. No. 5,222,914 which is a continuation of my application Ser. No. 573,397, filed Aug. 27, 1990, now abandoned, which is a continuation-in part of my application Ser. No. 321,861, filed on Mar. 10, 1989, now abandoned.

This invention relates to a constant velocity universal joint which has replaceable inserts for ball grooves.

In a constant velocity universal joint, the torque is transmitted by balls which are arranged between inner and outer race members and in contact with grooves therein. A retainer is located at an end of the inner race member. The only wear encountered in a constant velocity universal joint is in the ball grooves and balls. Usually, the entire universal joint is replaced when the ball and groove wear become excessive. At times, the grooves have been ground over-size to achieve smooth, uniform surfaces once again. Balls of larger diameter are then employed to fit the larger grooves. This repair is expensive and time-consuming, however, and it requires expensive machinery.

The present invention provides a constant velocity universal joint which has removable and replaceable inserts for the ball grooves. These are located in uniformly-spaced recesses around the inner and outer race members. The inserts are preferably held in the recesses by suitable means such as retaining rings which are bolted to the corresponding inner and outer race members and can be removed by conventional tools, such as wrenches. The inserts with the ball grooves thus can be replaced in the field, along with new balls, without the need of special equipment and at a lower cost than the high cost of repairs.

The ball groove inserts are preferably made from metal or other suitable material which can be made from a solid block with appropriate machining and then cut in half to form two inserts for inner and outer race members. They can also be manufactured individually as totally separate parts.

The inserts are also preferably formed with end projections which are received in appropriate recesses in the race members and cooperate with the retaining rings to prevent rotational movement of the inserts relative to the recesses in which they are retained.

In the universal joint according to the invention, a retainer contacts only one side of the bearing balls and is supported by a matching surface of a mating part. A single annular seal is located on the other side of the bearing balls and has direct contact between components of the inner and outer race members. The seal is relatively simple, particularly as compared with some employed in the serviceable universal joints of the aforesaid patent applications.

It is, therefore, a principal object of the invention to provide a fixed serviceable universal joint having a retainer which contacts only one side of the bearing balls and is supported by a matching surface of a mating part.

Another object of the invention is to provide a fixed serviceable universal joint having a relatively simple seal making direct contact between components of the inner and outer race members of the joint.

Many other objects and advantages of the invention will be apparent from the following detailed description of a preferred embodiment thereof, reference being made to the accompanying drawings, in which.

Figure 1:
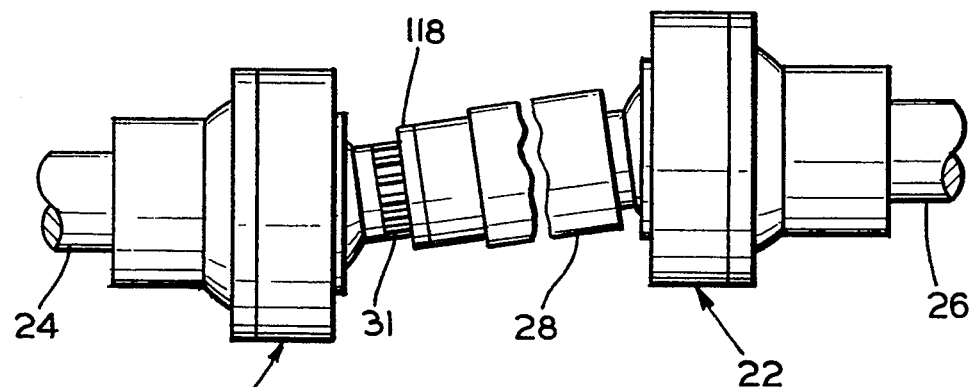
FIG. 1 is a schematic, view in elevation of two constant velocity universal joints embodying the invention connecting shafts through a sliding spline member to provide axial slip.

Referring to the drawings, and more particularly to FIG. 1, two constant velocity universal joints embodying the invention are indicated at 20 and 22 and are used to connect two shafts 24 and 26 through a connecting shaft 28. The universal joints can be used for industrial purposes or for vehicle applications and connect two shafts that are located at an angle and/or offset relative to one another. The angle or offset is accommodated through angular operation of universal joint length changes through a sliding member.

It is possible that one of these universal joints could be IS used with plunging type CV joints shown in U.S. Pat. No. 5,222,914 or equivalent which would eliminate the need for a sliding spline.

Figure 2:
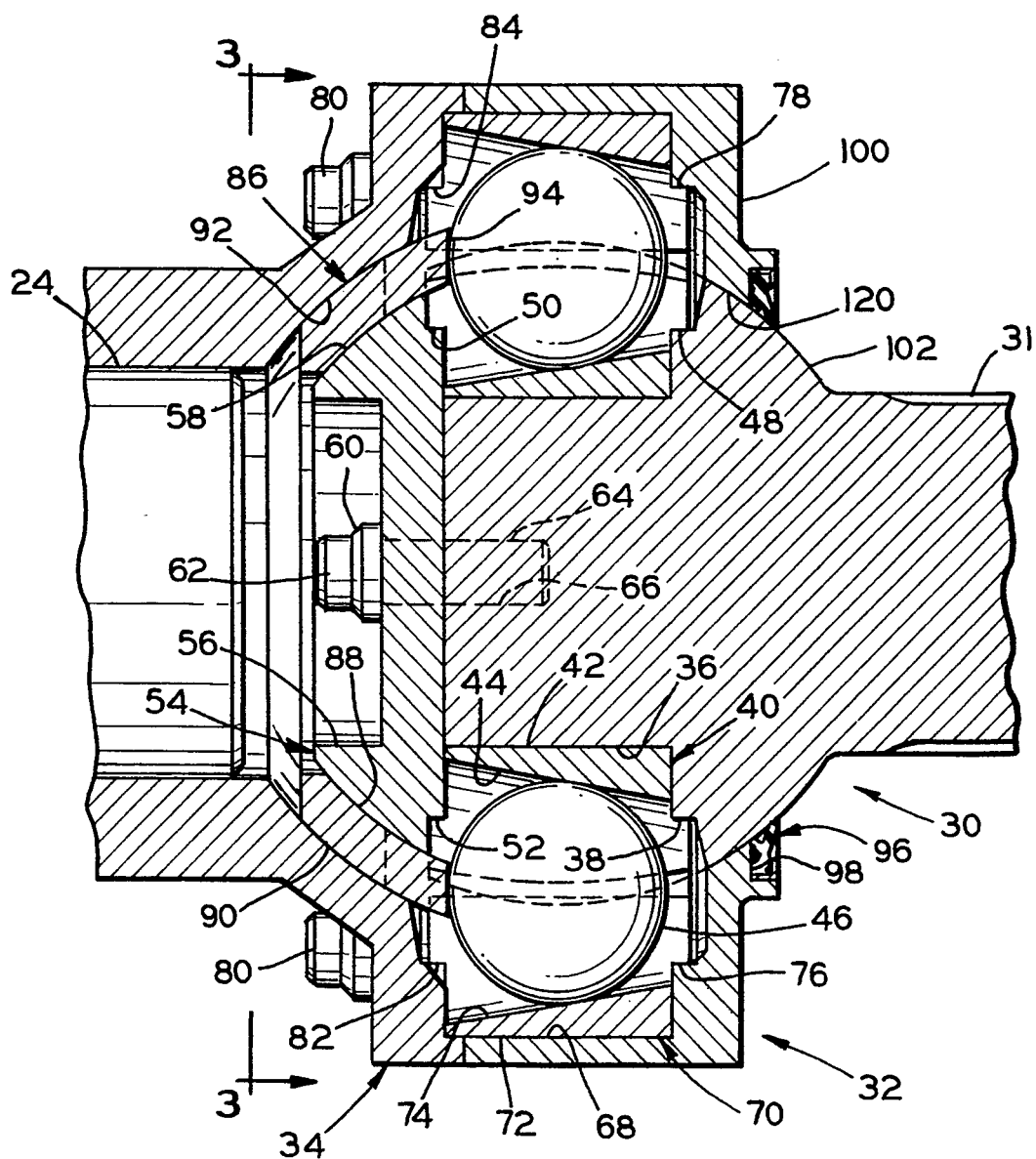
FIG. 2 is a greatly enlarged view in vertical cross section of one of the constant velocity universal joints of FIG. 1.
Figure 3:
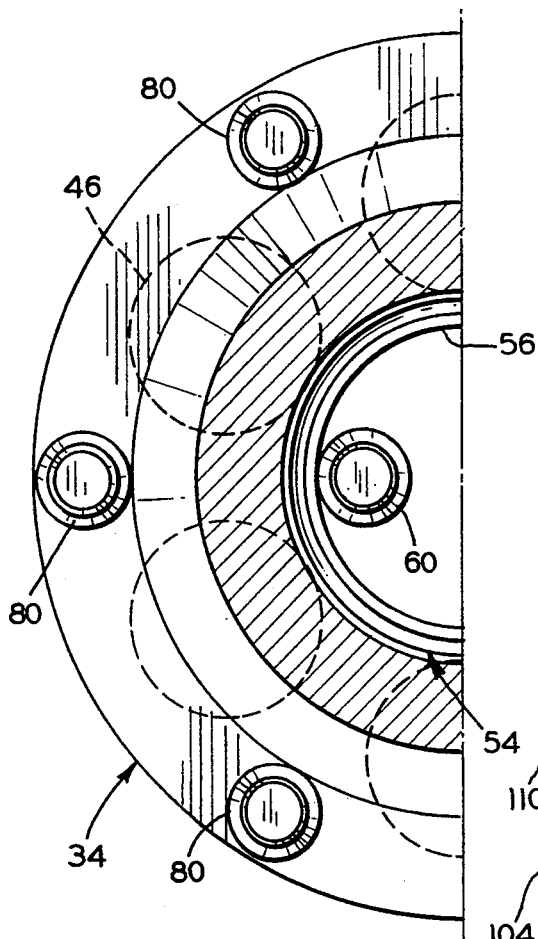
FIG. 3 is a view in transverse cross section taken along the lines 3—3 of FIG. 2.
Figure 6:
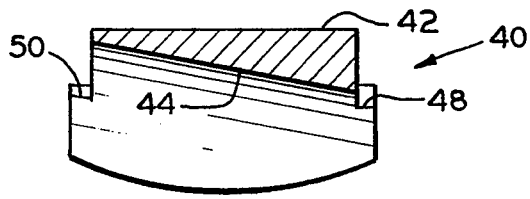
FIG. 6 is a view in longitudinal cross section of an insert employed in the universal joint.
Figure 7:
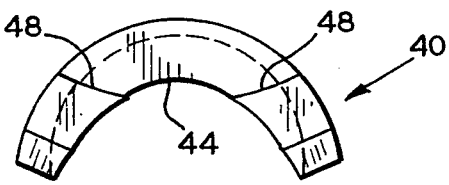
FIG. 7 is an end view of the insert of FIG. 6.

The universal joint 20 embodying the invention is shown more particularly in FIGS. 2 and 3. This universal joint is a fixed joint rather than the plunging type which requires a separate member for axial movement between shafts which are connected. The joint includes an inner hub race member 30 which can be structurally integral with a splined shaft 31. The joint also includes an outer race member 32 which is connected with an end of tile shaft 24. This is accomplished through an annular hub or flange 34 which can be structurally integral with the shaft 24 or a separate companion flange member.

The inner race member 30 has a plurality, in this case six, cavities or recesses 36 uniformly peripherally spaced therearound. The recesses 36 are of substantially semicircular shape in transverse cross section and extend a substantial portion of the length of the inner race member. The inner race member also has an annular flange or shoulder 38 at ends of the recesses.

An insert 40 has an outer surface 42 of substantially semicircular shape in transverse cross section. The insert 40 also has a groove 44 extending throughout its length, which groove is also of substantially semicircular shape in transverse cross section. A rolling element 46, in the form of a ball or roller, is received in each of the grooves 44. One end of each of the inserts 40 has axially-extending projections or shoulders 48 which extend beyond the insert ends and engage or cooperate with the shoulder 38 to aid in preventing rotation of the inserts in the recesses. The other ends of the inserts 40 also have axially-extending projections or shoulders 50 which extend beyond the ends and engage or cooperate with an annular shoulder 52 of a retaining ring or cap 54 to further aid in preventing rotation of the inserts in the recesses. The cap 54 has a large central recess 56 and a partially spherical outer surface 58. The cap is affixed to an end of the shaft 31 by fasteners in the form of machine screws 60 having heads 62 located in the recess 56 and threaded shanks 64 received in bores 66 of the shaft 31. The screws can easily be removed in the field by the use of common tools.

The outer race member 32 also has six, in this instance, cavities or recesses 68 which are uniformly peripherally spaced therearound and face inwardly toward the recesses 36, being similar in size and shape. The recesses 68 are of substantially semi-circular shape in transverse cross section and extend along a substantial portion of the length of the outer race member 32.

An insert 70 is located in each of the recesses 68 and has an outer surface 72 of substantially semicircular shape in transverse cross section. Each of the inserts 70 also has an inwardly-facing groove 74 to receive one of the rolling elements 46. An end of each of the inserts 70 has axially-extending projections or shoulders 76 which extend beyond the end of the insert and engage or cooperate with an annular shoulder 78 formed in the outer race member 32 to aid in preventing rotation of the insert 70 relative to the recess 68. The outer race member 32 in this instance is held in place against the hub 34 by fasteners in the form of machine screws 80 which extend through the hub and-into the body of the outer race member 32. Again, these fasteners 80 can be easily removed with common tools. The inserts 70 also have axially-extending projections or shoulders 82 which cooperate with an annular flange or shoulder 84 of the hub 34 to further aid in preventing rotation of the inserts in the recesses.

A retainer 86 abuts the rolling elements 46 but does not extend completely around them. The retainer 86 has partially spherical inner and outer surfaces 88 and 90 which engage the partially spherical surface 58 of the cap 54 and a partially spherical surface 92 formed in the hub 34. Thus, the spherical outer diameter of the retainer 86 is supported in a matching spherical inner diameter on the hub 34 but has a limited clearance with the cap 54. This helps retain lubricant around the rolling elements and the inserts. The retainer 86 further has fingers 94 extending outwardly therefrom and engaging the balls 46 in the inserts.

Figure 8:
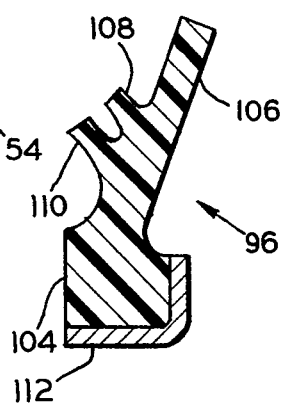
FIG. 8 is an enlarged view in transverse cross section of a seal used between the inner and outer races of the universal joint.

A single, relatively simple seal 96 seals directly between the inner race member 30 and the outer race member 32. The seal is held in an annular recess 98 on a face 100 of the outer race member 32 and engages a partially spherical surface 102 on the inner race member 30. In a preferred form, the seal 96 has a base 104 (FIG. 8) from which extends a long finger 106 and two shorter fingers 108 and 110, the latter two fingers being angled so as to be disposed substantially perpendicular to the partially spherical surface 102. The seal base 104 is held in an annular ring 112 of L-shaped cross section and is suitably affixed in the annular recess 98, as by a press fit.

Figure 9:
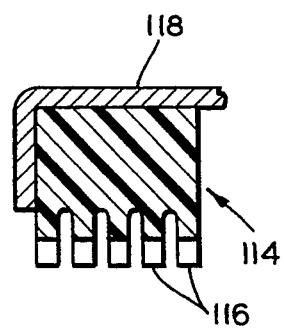
FIG. 9 is an enlarged view in section of a multiple lip seal for a sliding spline member.
Figure 4:
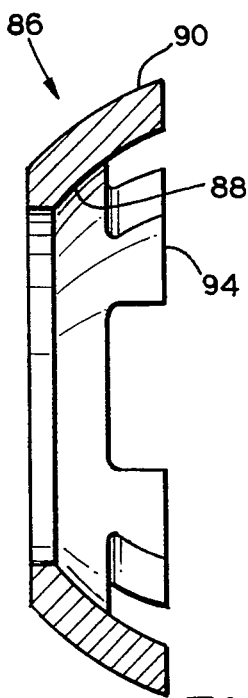
FIG. 4 is a view in transverse cross section of a retainer used with the universal joint of FIG. 2
Figure 5:
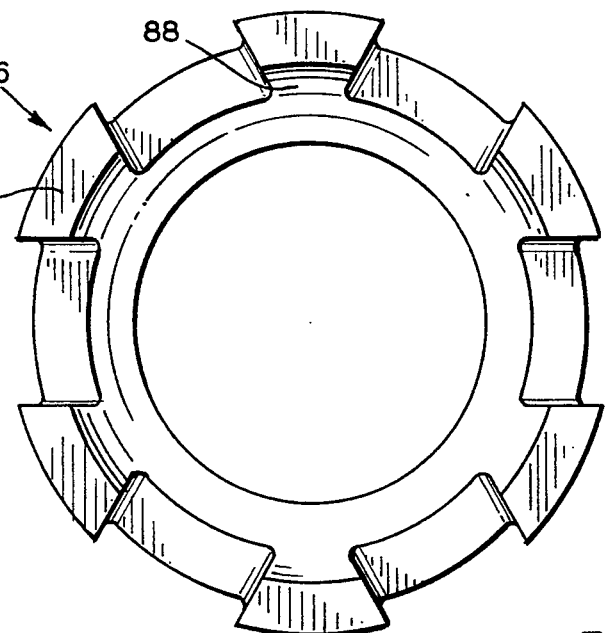
FIG. 5 is a front view in elevation of the retainer of FIG. 4.

A highly effective seal for the splined shaft 31 is shown in FIG. 9. A labyrinth seal 114 has a plurality of fingers 116 with spline grooves which engage the splined shaft. The seal 114 is backed up by a metal ring 118 which is also shown in FIG. 1. The multiple finger construction provides for an effective seal as the spline teeth without causing excessive drag when sliding during length changes.

The axial position of the inner race member 30 relative to the outer race member 32 is established by spherical contact at the surface 102 and a surface 120 of the outer race member 32.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A fixed constant velocity universal joint having spherical contact and support directly between inner and outer race members to prevent axial movement comprising the inner race member having a plurality of uniformly circumferentially-disposed first recesses of substantially semicircular shape in transverse cross section, the outer race member having a plurality of second recesses of substantially semicircular shape in transverse cross section and positioned opposite said first recesses, a first insert for each of said first recesses, said first inserts, when worn, being replaceable with new inserts, each of said first inserts having a substantially semi-cylindrical outer surface fitting complementary with the corresponding first recess and a groove of substantially semicircular cross-sectional shape forming an inner surface, a second insert for each of said second recesses, said second inserts, when worn, being replaceable with new inserts, each of said second inserts having a substantially semi-cylindrical outer surface fitting complementary with the corresponding second recess and a groove of substantially semicircular cross-sectional shape forming an inner surface, roller elements in corresponding grooves of said inserts, each of said first inserts having at least one axially-extending projection extending beyond an end thereof and forming a shoulder, each of said second inserts having at least one axially-extending projection extending beyond an end thereof and forming a shoulder, first means carried by said inner race member and forming an annular shoulder engagable with the shoulders of the axially-extending projections of said first inserts in said first recesses to prevent rotational movement of said first inserts in said first recesses, second means carried by said outer race member and forming a second annular shoulder engagable with the shoulders of the axially-extending projections of said second inserts in said second recesses to prevent rotational movement of said second inserts in said second recesses, a retainer fully enclosed in said universal joint and abutting said roller elements, and a seal engaging said inner and outer race members on the side of said roller elements opposite said retainer.

2. A constant velocity universal joint according to claim 1 wherein said seal comprises a base having at least one resilient finger extending therefrom, said base being held in an annular recess in said outer race member, said inner race member having a partially spherical surface, and said resilient finger engaging said partially spherical surface.

3. A constant velocity universal joint according to claim 2 wherein said seal comprises at least one additional finger engaging said partially spherical surface.

4. A constant velocity universal joint according to claim 2 wherein an annular ring extends around said base and is received in said annular recess in said outer race member.

5. A constant velocity universal joint according to claim 1 wherein each of said first inserts has at least one additional axially-extending projection extending beyond tile other end thereof and forming a shoulder, and a cap affixed to an end of said inner race member and forming an annular shoulder cooperating with said additional axially-extending projections.

6. A constant velocity universal joint according to claim 5 wherein said cap has a partially spherical surface engaging an inner partially spherical surface of said retainer.

7. A fixed constant velocity universal joint having direct spherical contact and support between inner and outer race members to prevent axial movement comprising the inner race member having a plurality of uniformly circumferentially-disposed first recesses of substantially semicircular shape in transverse cross section, the outer race member having a plurality of second recesses of substantially semicircular shape in transverse cross section and positioned opposite said first recesses, an insert for each of said recesses, said inserts, when worn, being replaceable with new inserts, each of said inserts having a substantially semi-cylindrical outer surface fitting complementary with the corresponding recess and a groove of substantially semicircular cross-sectional shape forming an inner surface, roller elements in corresponding grooves of said inserts, first retaining means carried by said inner race member for retaining the inserts in said first recesses, and second retaining means carried by said outer race member for retaining the inserts in said second recesses, said inserts having axially-extending projections extending beyond ends thereof and beyond ends of said recesses, said projections cooperating with said first and second retaining means to aid in preventing said inserts from rotating in said recesses, a retainer abutting said roller elements, and a seal engaging said inner and outer race members on the side of said roller elements opposite said retainer.

8. A constant velocity universal joint according to claim 7 wherein said seal comprises a base having at least one resilient finger extending therefrom, said base being held in an annular recess in said outer race member, said inner race member having a partially spherical surface, and said resilient finger engaging said partially spherical surface and providing an effective seal through angular motion between said inner and outer race members.

9. A constant velocity universal joint according to claim 8 wherein said seal comprises at least one additional finger engaging said partially spherical surface.

10. A constant velocity universal joint according to claim 8 wherein an annular ring extends around said base and is received in said annular recess in said outer race member.

11. A constant velocity universal joint according to claim 7 wherein each of said first inserts has at least one additional axially-extending projection extending beyond the other end thereof and forming a shoulder, and a cap affixed to an end of said inner race member and forming an annular shoulder cooperating with said additional axially-extending projections.

12. A constant velocity universal joint according to claim 11 wherein said cap has a partially spherical surface with limited clearance with respect to an inner partially spherical surface of said retainer.

13. A fixed constant velocity universal joint comprising an inner race member having a plurality of uniformly circumferentially-disposed first recesses of substantially semicircular shape in transverse cross section, an outer race member having a plurality of second recesses of substantially semicircular shape in transverse cross section and positioned opposite said first recesses, a first insert in each of said first recesses, said first inserts, when worn, being replaceable with new inserts, each of said first inserts having a substantially semi-cylindrical outer surface fitting with the corresponding first recess and a groove of substantially semicircular cross-sectional shape forming an inner surface, a second insert in each of said second recesses, said second inserts, when worn, being replaceable with new inserts, each of said second inserts having a substantially semi-cylindrical outer surface fitting with the corresponding second recess and a groove of substantially semicircular cross-sectional shape forming an inner surface, roller elements in corresponding grooves of said inserts, each of said first inserts having at least one axially-extending projection extending outwardly therefrom and forming a shoulder, each of said second inserts having at least one axially-extending projection extending outwardly therefrom and forming a shoulder, a cap, fastener means affixing said cap centrally to the end of said inner race member, said cap having an annular shoulder cooperating with the shoulder of said axially-extending projections of said first inserts to prevent rotational movement of said first inserts in said first recesses, a hub, means affixing said hub to the end of said outer race member, said hub having an annular shoulder cooperating with the shoulders of said axially-extending projections of said second inserts to prevent rotational movement of said second inserts in said second recesses, and a seal engaging said inner and outer race members on the side of said roller elements opposite said cap and said hub.

14. A constant velocity universal joint according to claim 13 wherein a retainer enclosed in said universal joint abuts and retains said roller elements in their working position, said retainer being on the side of said roller elements opposite said seal.

15. A constant velocity universal joint according to claim 13 wherein said seal comprises a base having at least one resilient finger extending therefrom, said base being held in an annular recess in said outer race member, said inner race member having a partially spherical surface, and said resilient finger engaging said partially spherical surface.

16. A constant velocity universal joint according to claim 15 wherein said seal comprises at least one additional finger engaging said partially spherical surface.

17. A constant velocity universal joint according to claim 15 wherein an annular ring extends around said base and is received in said annular recess in said outer race member.

18. A constant velocity universal joint according to claim 13 wherein said cap has a partially spherical surface engaging an inner partially spherical surface of said retainer.

* * * * *

UNITED STATES PATENT AND TRADEMARK OFFICE
CERTIFICATE OF CORRECTION

PATENT NO.   : 5,368,523
DATED        : November 29, 1994
INVENTOR(S)  : Philip J. Mazziotti It is certified that error appears in the above-identified patent and that said Letters Patent is hereby corrected as shown below:

Column 2, line 15, after "and" insert --3;--.

Column 2, line 37, delete "IS".

Column 2, line 48, substitute --the-- for "tile".

Column 3, line 32, substitute --and into-- for "and-into".

Column 5, line 4, claim 5, line 4, substitute --the--
    for "tile".

Signed and Sealed this

Thirty-first Day of January, 1995

Attest:

BRUCE LEHMAN

Attesting Officer             Commissioner of Patents and Trademarks